Patented Sept. 24, 1935

2,015,258

UNITED STATES PATENT OFFICE 2,015,258

CHEESE FLAVORING AND METHOD OF PRODUCING THE SAME

Forest H. Clickner, Chicago, Ill., assignor to Kraft-Phenix Cheese Corporation, Chicago, Ill., a corporation of Delaware No Drawing. Application May 20, 1935, Serial No. 22,439

11 Claims. (Cl. 99—11)

My invention relates to an improved composition of matter which is of special utility for imparting a cheese flavor to various articles of food. More specifically, my invention contemplates a smooth and homogeneous composition containing a comminuted cheese of distinct flavor in a carrier of fat. In said improved compound, the cheese particles are substantially uniformly distributed in said fatty carrier and each minute particle of cheese is encased in a film of said fat.

In a preferred embodiment, my invention contemplates the use of a substantially dry cheese prepared in accordance with a special method described and claimed in my co-pending application Serial No. 725,346, in combination with a substantially dry fat which is normally solid at room temperatures. When such substantially dry ingredients are used, my improved compound has superior keeping qualities and the cheese is also substantially immune from saponification, which is likely to occur in the presence of moisture and alkali, such as may be present in the cheese itself or in other materials with which the improved compound may come in contact.

I am aware that suggestions have been made in the past to combine cheese and fat. However, so far as I am aware, that has never been done successfully to produce a smooth and homogeneous product and having a full cheese flavor. For example, Parsons Patent No. 1,737,770 suggests the mixing with butter of a combination of cheese and powdered milk. Aside from the fact that said patent does not describe how such an admixture with butter is to be produced to obtain a homogeneous product, Parsons specifies that his cheese is to be heated with milk solids at a temperature of 100° F. until dry, a procedure which was found to rob the cheese of its distinctive flavor.

In accordance with my invention, I have evolved a process whereby cheese in finely divided form and relatively dry is intimately admixed with fat at an elevated temperature and in fluid condition, whereby the cheese becomes substantially uniformly distributed in the body of fat and the individual particles of cheese become coated with fat, and the mixture is then allowed to cool with continued agitation, so that the cheese particles are not permitted to settle out. The fatty medium upon solidifying will thus have the cheese particles uniformly distributed therein.

The following is a specific example of my invention and is not to be considered in any sense as limiting.

Cheese ingredient

I preferably use as the cheese ingredient a comminuted cheese which is relatively low in moisture and high in flavor. I do not consider myself as limited to any special type of cheese. An Italian type of grated cheese containing about 10 per cent moisture may be used, but I prefer a well aged and snappy American dried by any suitable means, as by sub-dividing the cheese in placing it in a drying tunnel at a moderate temperature, so as not to destroy the flavor, or dried in the manner described in my allowed application Serial No. 725,346. Said drying method is as follows:

Make up a blend of good aged American cheese, preferably low in moisture. Comminute the mix and heat to a temperature of 165° F., preferably with direct saturated steam. Sufficient water should be added to bring the moisture content up to about 70 per cent, preferably with sufficient citric or other acid so that the end product has a pH value of about 5.0.

Instead of using water and citric acid or other acid, as described, there is a material advantage in employing an acid whey solution, or an acid milk (whole or skim) may be employed. Also, in place of using citric acid, other acids such as Malic acid may be used. I prefer to use as the acid source whey which has been permitted to develop its acid by natural fermentation.

During and subsequent to the heating, and after the addition of the acid solution, the mixture is vigorously agitated so as to obtain as uniform a mixture as possible. It is then preferably homogenized and, before cooling, conducted by some suitable form of forced feed apparatus directly to the spray heads of a spray drying equipment such as is used for the desiccation of milk, or dried on rollers in known or other suitable manner. The end product will be a powder containing about 0.8 per cent of moisture and the acidity should be about pH 5.0, sufficient acid or acid whey or milk having been added, if necessary, to produce this acidity in the end product.

The cheese powder produced as just described usually has a moisture content not over about 3 per cent and may be below 1 per cent.

Cheese-fat combination

The cheese power is admixed with an edible fat. I do not consider myself as limited to any special type of fat, except that it preferably should be solid at room temperature. The fats which I have found especially suitable are anhydrous ones, such as refined cocoanut oil and hydrogenated cottonseed, sesame, and corn oil. Numerous other edible fats will suggest themselves, although, of course, market conditions will be an important factor in determining the choice. The fat used for my purpose should have, in addition to the factors mentioned above, high stability against rancidification.

As to proportions, in a preferred embodiment I may use 35 per cent of cheese and about 65 per cent of fat. However, these proportions may vary within wide limits and I may use as low as 15 per cent cheese or as much as 50 per cent.

My preferred method of combining the cheese and fat is as follows:

The fatty ingredient is heated, as in a steam jacketed or hot water jacketed kettle, to about 150° F. The powdered cheese is then introduced gradually with stirring, care being taken that all lumps are thoroughly broken up. The cheese goes into suspension freely and the agitation is continued until a uniform suspension is obtained. The temperature may then be reduced to about 140° F.

The material is then drawn off and is preferably strained to remove any large particles of cheese, the agitation being continued. The material is preferably run into a device where it can be whipped while being quickly cooled to a congealing temperature, such as an ice cream freezer. While, of course, it may be whipped without refrigeration, until it has congealed by giving off its heat to the atmosphere, it is found that the most practical and expedient procedure is the ice cream freezer technique. It will be understood, of course, that there may be some tendency for the cheese and fat ingredients to separate during the cooling stage if the whipping is not continued. After congealing, the product may be placed in cans or other suitable containers and disposed in a cooler over night to complete the setting of the material.

Where an anhydrous product is desired, it is highly desirable that contact of the ingredients with moisture be avoided throughout the entire process, and care should be taken that all containers, utensils and apparatus be entirely dry.

The composition prepared as described above consists of cheese in a finely divided form uniformly distributed throughout a body of fat, substantially each particle of cheese being thoroughly coated with a film of fat. The material is substantially solid at room temperature and preferably of a smooth consistency similar to butter, and has a sharp, pleasing cheese flavor.

The cheese flavoring composition described above has wide applications in the food industry. As described in my co-pending application Serial No. 6,387, said material may be applied to farinaceous goods, such as puffed cereals, popcorn, and the like, as, for example, by melting and spraying thereon, or it may be applied to foodstuffs in other obvious ways, as, for example, by spreading. Said material is of value as a coating or filling for baked goods, such as crackers, etc., and may, if desired, be admixed with fillers, such as milk solids, cornstarch, etc., before application to such baked goods. When my cheese flavoring composition is melted and sprayed, it has the property of penetrating into any porous foodstuff to which it is applied, forming an intimate and permanent bond therewith.

Various modifications coming within the spirit of my invention will doubtless suggest themselves to those skilled in the art. Hence, I do not wish to be restricted to the specific embodiments disclosed above or uses mentioned except to the extent indicated in the appended claims, which are to be interpreted as broadly as possible consistent with the state of the art.

This application is a continuation-in-part of applicant's copending application, Serial No. 725,346, filed May 12, 1934.

I claim as my invention:

1. A method of preparing a composition of the class described, comprising intimately admixing, at an elevated temperature, a low moisture cheese with a dry, edible fat which is solid at room temperature until a substantially uniform suspension of said cheese in said fat is obtained, and cooling said product while continuing the agitation.

2. A method of preparing a composition of the class described, comprising intimately admixing a low moisture cheese with a dry, edible fat which is solid at room temperature, while heating the material at about 150° F., until a substantially uniform suspension of said cheese in said fat is obtained, and cooling said product while continuing the agitation.

3. A cheese flavoring composition comprising a homogeneous mixture of comminuted cheese of distinct flavor and of low moisture content in a carrier of substantially dry, edible fat which is normally solid at room temperature.

4. A food compound comprising a carrier consisting of a dry edible fat which is solid at room temperature, and a comminuted cheese having a distinct cheese flavor, said compound having a moisture content sufficiently low that tendency of the fat content to saponify in the presence of alkali will be substantially negligible.

5. A food compound comprising a carrier consisting of a dry, edible fat which is solid at room temperature, and a comminuted cheese having a distinct cheese flavor, said compound having such an acidity and a moisture content sufficiently low that tendency of the fat content to saponify in the presence of alkali will be substantially negligible.

6. A food compound comprising a carrier consisting of a dry, edible fat which is solid at room temperature, and a comminuted cheese having a distinct cheese flavor and having a moisture content of not more than about 3 per cent, the particles of said cheese being substantially coated by said fat.

7. Powdered cheese having a distinct cheese flavor and having a moisture content of not more than one per cent distributed in a body of substantially dry, edible fat which is substantially solid at room temperature.

8. Powdered cheese containing less than 3 per cent moisture and having a pH value of 5.0 or less distributed in a body of substantially dry, edible fat which is substantially solid at room temperature.

9. A composition as described in claim 6, wherein the cheese constituent comprises from 15 to 50 per cent of the product of said composition.

10. A composition as defined in claim 6, wherein the cheese comprises approximately 35 per cent of said composition and has a pH value not substantially greater than 5.0.

11. As an ingredient for bakery products, a homogeneous combination of a dry, edible fat and cheese in powdered form uniformly distributed therein, said cheese having a distinct cheese flavor and containing not more than about 3 per cent moisture and having an acidity materially greater than that present in normal American-type cheese.

FOREST H. CLICKNER.